United States Patent
Sato et al.

(10) Patent No.: US 10,079,904 B2
(45) Date of Patent: Sep. 18, 2018

(54) PACKET TRANSFER SYSTEM, RELAY DEVICE, PACKET TRANSFER METHOD, AND PROGRAM

(71) Applicant: Anritsu Networks Co., Ltd., Atsugi-shi (JP)

(72) Inventors: Takayuki Sato, Atsugi (JP); Junya Oda, Atsugi (JP)

(73) Assignee: Anritsu Networks Co., Ltd., Atsugi-shi, Kanagawa (JP)

(*) Notice: Subject to any disclaimer, the term of this patent is extended or adjusted under 35 U.S.C. 154(b) by 0 days.

(21) Appl. No.: 15/159,529

(22) Filed: May 19, 2016

(65) Prior Publication Data

US 2016/0352459 A1    Dec. 1, 2016

(30) Foreign Application Priority Data

May 29, 2015   (JP) .................................. 2015-109273

(51) Int. Cl.
| | |
|---|---|
| H04L 1/00 | (2006.01) |
| H04L 29/08 | (2006.01) |
| H04L 29/06 | (2006.01) |
| H04L 1/16 | (2006.01) |

(52) U.S. Cl.
CPC .......... *H04L 67/2804* (2013.01); *H04L 1/004* (2013.01); *H04L 1/1607* (2013.01); *H04L 69/16* (2013.01); *H04L 1/0057* (2013.01)

(58) Field of Classification Search
None
See application file for complete search history.

(56) References Cited

U.S. PATENT DOCUMENTS

| | | | | |
|---|---|---|---|---|
| 4,701,923 A | * | 10/1987 | Fukasawa | H03M 13/03 714/708 |
| 2004/0015768 A1 | * | 1/2004 | Bordes | H03M 13/35 714/758 |
| 2004/0177310 A1 | * | 9/2004 | Mohan | H04L 27/001 714/776 |
| 2006/0107187 A1 | * | 5/2006 | Hannuksela | H04L 47/2416 714/776 |

FOREIGN PATENT DOCUMENTS

| | | |
|---|---|---|
| JP | 2003-318867 | 11/2003 |
| JP | 2004-312359 | 11/2004 |

* cited by examiner

*Primary Examiner* — Daniel F. McMahon
(74) *Attorney, Agent, or Firm* — Greer Burns & Crain Ltd.

(57) ABSTRACT

In a packet transfer system, a transmission-side relay device extracts and integrates data included in a packet transmitted from a transmission device to obtain a packet data stream, extracts data from the packet data stream to obtain a data block, encodes the data block with an error correction code to generate redundant data as a redundant block, generates an error correction data stream obtained by integrating the data block and the redundant block, and packetizes the error correction data stream and transmits the packetized error correction data stream. A reception-side relay device restores missing data using redundant data included in the received data in a case in which there is missing data. The system enables packet transmission and reception to be efficiently performed even in a high loss rate environment.

6 Claims, 14 Drawing Sheets

PACKET TRANSFER SYSTEM, RELAY DEVICE, PACKET TRANSFER METHOD, AND PROGRAM

TECHNICAL FIELD

The present invention relates to a packet transfer system, a relay device, a packet transfer method, and a program.

BACKGROUND ART

A packet transfer system using a proxy device has been proposed (for example, see Patent Document 1). In the system of Patent Document 1, when a transmission network device 1 and a reception network device 4 transmit and receive packets according to Transmission Control Protocol/Internet Protocol (TCP/IP), a TCP server 2 and a TCP server 3 transmit and receive packets according to TCP/IP protocol on behalf of the transmission network device 1 and the reception network device 4. Accordingly, it possible to efficiently transmit and receive packets in the transmission network device 1 and the reception network device 4.

RELATED ART DOCUMENT

Patent Document

[Patent Document 1] JP-A-2004-312359
[Patent Document 2] JP-A-2003-318867

DISCLOSURE OF THE INVENTION

Problem that the Invention is to Solve

Usually, data redundancy using an error code is performed by creating one redundant packet for a plurality of (N) pieces of fixed length data such as a UDP or a radio packet and transmitting the redundant packet (for example, see Patent Document 2). Even when one of N pieces of data is missing, a missing datagram is restored from the redundant packet. On the other hand, in the case of TCP, data is stream data and does not have a fixed length. Further, since there is no concept of a block, it is difficult to have redundancy in the data. Therefore, in TCP, packet retransmission and congestion control are performed at the time of packet loss. However, in a high loss rate environment, if packet retransmission is performed at the time of packet loss, it is impossible to efficiently perform packet transmission and reception. In particular, in a long-distance TCP communication, the packet retransmission affects a delay time and efficiency of packet transfer is significantly degraded.

Accordingly, an object of the present invention is to enable packet transmission and reception to be efficiently performed even in a high loss rate environment.

Means for Solving the Problem

A packet transfer system according to the present invention is a packet transfer system in which a transmission-side relay device and a reception-side relay device transfer data transmitted from a transmission device to a reception device, wherein the transmission-side relay device includes a first integrated circuit in communication with a first recording medium, the first recording medium storing a first computer program which, when executed by the first integrated circuit, causes the first integrated circuit to perform functions including, extracting and integrating data included in a packet transmitted from the transmission device to obtain a packet data stream, extracting data having a predetermined block size determined in advance from the packet data stream to obtain a data block, generating redundant data obtained by encoding the data block with an error correction code to obtain a redundant block, generating an error correction data stream obtained by integrating the data block and the redundant block, and packetizing the error correction data stream and transmitting the packetized error correction data stream to the reception-side relay device, and the reception-side relay device includes a second integrated circuit in communication with the first integrated circuit and a second recording medium, the second recording medium storing a second computer program which, when executed by the second integrated circuit, causes the second integrated circuit to perform functions including, receiving the data transmitted from the transmission-side relay device to build the error correction data stream, restoring missing data using the redundant data included in the received data in a case in which there is missing data that cannot be received in the data transmitted from the transmission-side relay device, building the packet data stream, and packetizing the built packet data stream and transmitting the packetized packet data stream to the reception device.

In the packet transfer system according to the present invention, the reception-side relay device may request the transmission-side relay device to retransmit the missing data when the missing data cannot be restored using the redundant data, and the transmission-side relay device may retransmit the missing data to the reception-side relay device and control a congestion window when receiving the retransmission request.

In the packet transfer system according to the present invention, the reception-side relay device may not request the transmission-side relay device to retransmit the missing data when the missing data can be restored using the redundant data.

A relay device according to the present invention functions as the transmission-side relay device or the reception-side relay device included in the packet transfer system according to the present invention.

A packet transfer method according to the present invention is a packet transfer method in which a transmission-side relay device and a reception-side relay device transfer data transmitted from a transmission device to a reception device, wherein the transmission-side relay device extracts and integrates data included in a packet transmitted from the transmission device to obtain a packet data stream, extracts data having a predetermined block size determined in advance from the packet data stream to obtain a data block, generates redundant data obtained by encoding the data block with an error correction code to obtain a redundant block, generates an error correction data stream obtained by integrating the data block and the redundant block, and packetizes the error correction data stream and transmits the packetized error correction data stream to the reception-side relay device, and the reception-side relay device receives the data transmitted from the transmission-side relay device to build the error correction data stream, restores missing data using the redundant data included in the received data in a case in which there is missing data that cannot be received in the data transmitted from the transmission-side relay device, builds the packet data stream, and packetizes the built packet data stream and transmits the packetized packet data stream to the reception device.

A program according to the present invention is a program for realizing each of functions included in the transmission-side relay device or the reception-side relay device according to the present invention.

Advantage of the Invention

According to the present invention, it is possible to enable packet transmission and reception to be efficiently performed even in a high loss rate environment.

BEST MODE FOR CARRYING OUT THE INVENTION

Hereinafter, embodiments of the present invention will be described in detail with reference to the accompanying drawings. The present invention is not limited to the following embodiments. Examples of the embodiments are merely illustrative, and the present invention may be implemented in various forms of modifications or improvements based on the knowledge of those skilled in the art. In the present specification and the drawings, components denoted with the same reference signs are assumed to be the same components.

Embodiment 1

Figure 1:
FIG. 1 illustrates an example of a configuration of a packet transfer system according to an embodiment of the present invention.

FIG. 1 illustrates an example of a configuration of a packet transfer system according to this embodiment. The packet transfer system according to this embodiment includes a transmission device 10, a transmission-side relay device 20, a reception-side relay device 30, and a reception device 40. The transmission-side relay device 20 and the reception-side relay device 30 are connected to each other over a communication network.

The transmission device 10 transmits a packet. The transmission-side relay device 20 transfers the packet transmitted by the transmission device 10 to the reception-side relay device 30.

The reception-side relay device 30 transfers the packet received from the transmission-side relay device 20 to the reception device 40.

The reception device 40 receives the packet from the reception-side relay device 30.

The transmission of the packet from the transmission device 10 to the reception device 40 is performed according to TCP/IP. In this case, the transmission-side relay device 20 is on behalf of the transmission device 10, the reception-side relay device 30 is on behalf of the reception device 40, and the transmission-side relay device 20 and the reception-side relay device 30 perform transmission and reception of a message according to TCP/IP.

The transmission-side relay device 20 converts a TCP packet from the transmission device 10 into a packet data stream, reconstructs a TCP packet for each session, and then transfers the TCP packet to the reception-side relay device 30. Here, when the transfer from the transmission-side relay device 20 to the reception-side relay device 30 is performed, a single session is reconstructed, and in addition, a plurality of sessions may be reconstructed together. This scheme is also effective in a relay device that bundles a plurality of TCP sessions sent from the reception device into one TCP session for relaying.

Figure 2:
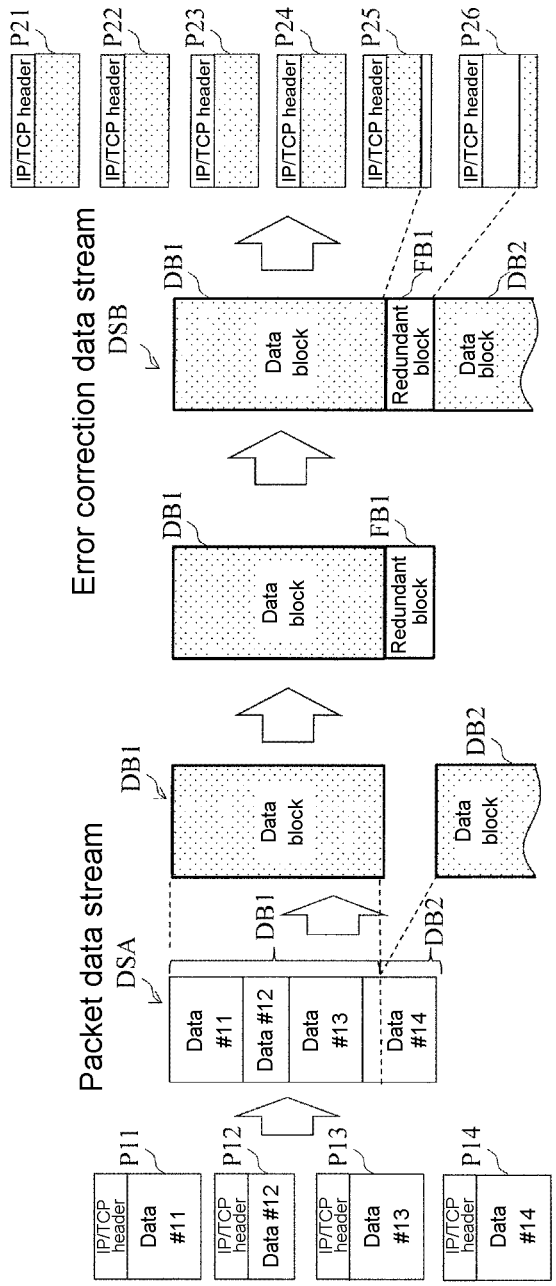
FIG. 2 illustrates an example of an operation of a transmission-side relay device 20.

FIG. 2 illustrates an example of an operation of the transmission-side relay device 20.

The transmission-side relay device 20 receives packets P11 to P14 having a TCP/IP header attached thereto, from the transmission device 10. If the transmission-side relay device 20 receives the packet from the transmission device 10, the transmission-side relay device 20 removes the TCP/IP header to extract data #11 to #14 of the packets P11 to P14, and integrates the extracted data #11 to #14 to construct the packet data stream DSA. In the integration of the data, the data within the packet is arranged using information of the TCP/IP header.

The transmission-side relay device 20 cuts out the data block DB1 having a predetermined block size from the packet data stream DSA. In this case, the original data packet #14 may be separated into DB1 and DB2. The predetermined block size is an arbitrary data size allowing error correction and is determined by, for example, negotiation in the transmission-side relay device 20 and the reception-side relay device 30 in advance. The error correction is arbitrary and, for example, forward error correction (FEC) can be used.

The transmission-side relay device 20 encodes the cut data block DB1 with an error correction code and generates a redundant block FB1 in which redundant data after encoding is described.

Figure 3:
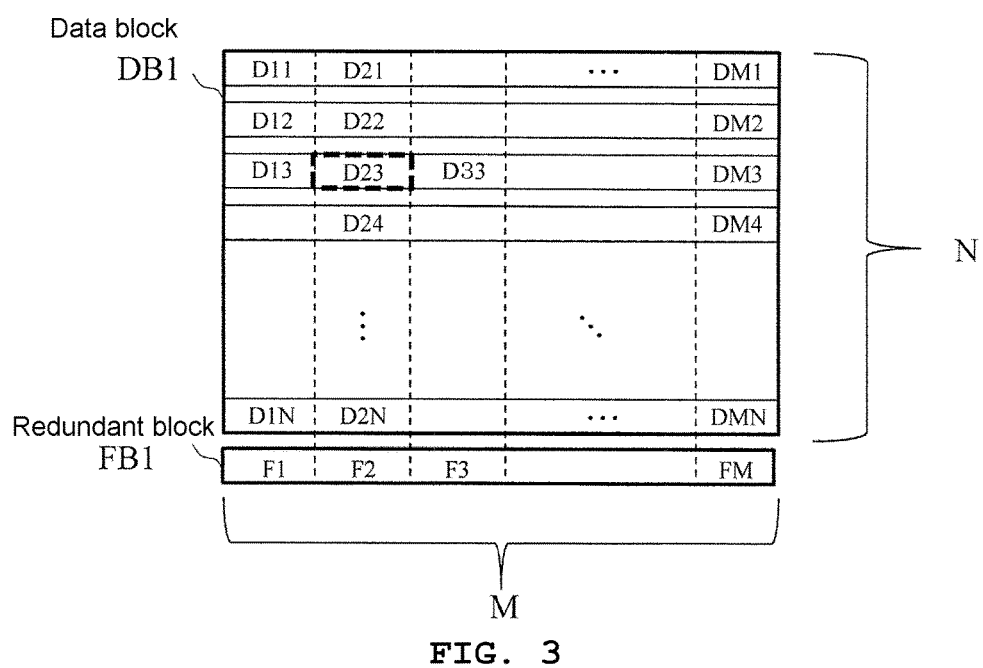
FIG. 3 illustrates an example of generation of redundant data.

In this case, in case in which a redundancy rate is 1/N and a redundant block size is M, it is preferable to develop data of a data block DB1 in a two-dimensional N×M arrangement and generate redundant data, as illustrated in FIG. 3. In this case, for example, one piece of redundant data F2 is calculated using N pieces of data D21 to D2N. A method for the calculation is arbitrary and, for example, exclusive OR (EXOR) is used. Although it is necessary to match a block position in a TCP stream at a transmission node and a reception node, a position designation may be performed using a TCP sequence number. Further, even in a case in which there is missing data in consecutive data such as data D13 and data D23, both of the data can be restored.

The transmission-side relay device 20 generates an error correction data stream DSB in which the data block DB1 and the redundant block FB1 are integrated. Accordingly, the redundant block is interposed in a position at a regular interval of the data stream. The transmission-side relay device 20 splits the error correction data stream DSB into split data having a predetermined data size, and transmits packets P21 to P26 obtained by attaching a TCP/IP header to each of the split data to the reception-side relay device 30.

Here, the transmission-side relay device 20 transmits the data blocks DB1 and DB2 and the redundant block FB1 to the reception-side relay device 30 without distinguishing between the data blocks DB1 and DB2 and the redundant block FB1. For example, both of the data blocks DB1 and DB2 and the redundant block FB1 coexist within one packet, as in the packets P25 and P26.

Therefore, when the error correction data stream DSB is generated, it is preferable for the redundant data and the transmission data to be arranged in a position in which the redundant data and the transmission data are not transmitted in one packet. For example, in a case in which redundant data F1 is calculated using data D11, D12, D13, . . . , DIN in FIG. 3, it is preferable for the data D11, D12, D13, . . . , DIN and the redundant data F1 to be arranged in different packets.

Figure 4:
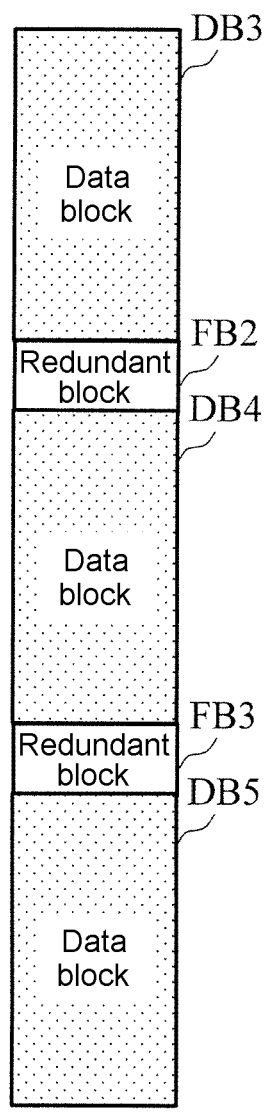
FIG. 4 illustrates an example of an arrangement of a redundant block.

Further, it is preferable for the data block DB1 and the redundant block FB1 in the error correction data stream DSB not to be continuous. For example, as illustrated in FIG. 4, a data block DB3, a redundant block FB2, a data block DB4, a redundant block FB3, and a data block DB5 may be arranged in this order.

Figure 5:
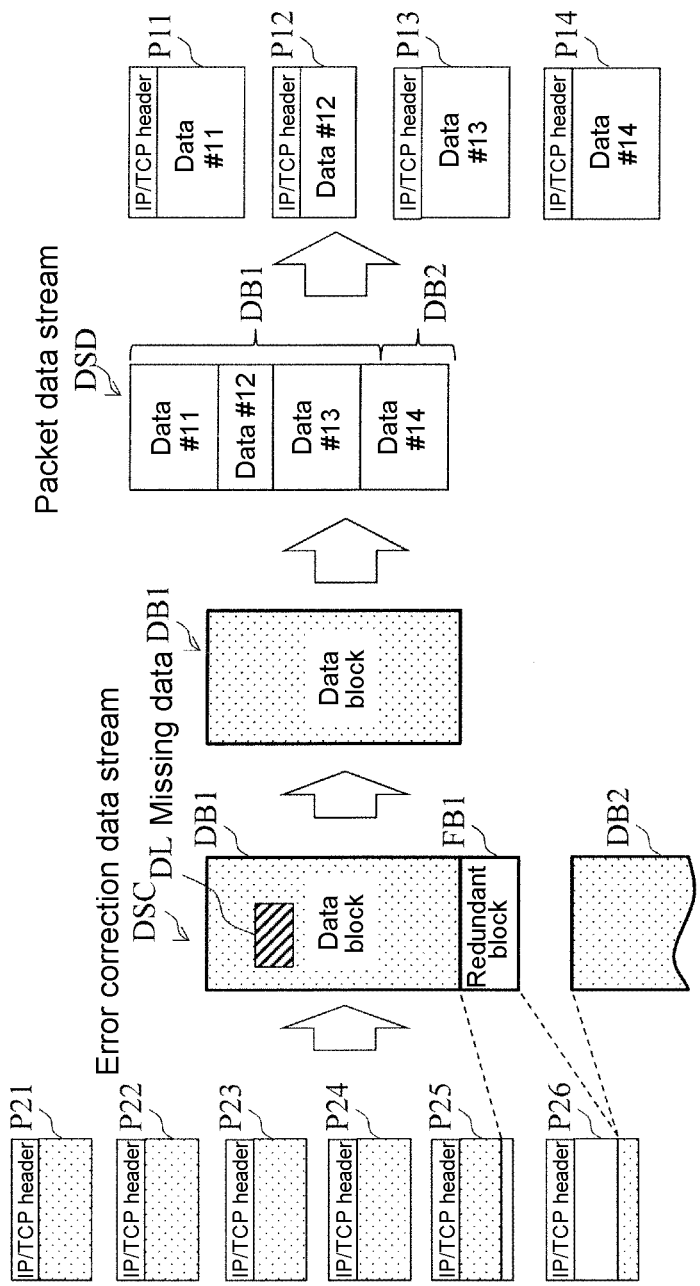
FIG. 5 illustrates an example of an operation of a reception-side relay device 30.

FIG. 5 illustrates an example of an operation of the reception-side relay device 30.

The reception-side relay device 30 receives packets P21 to P26 from the transmission-side relay device 20. If the reception-side relay device 30 receives the packets P21 to P26, the reception-side relay device 30 removes TCP/IP headers to extract data of the packets P21 to P26 and integrates the extracted data to construct an error correction data stream DSC. In the integration of the data, the data within the packet is arranged using information of the TCP/IP header.

The reception-side relay device 30 determines whether or not there is missing data DL in which split data is missing when integrating the data. For example, in a case in which a sequence number attached to the TCP/IP header or the data is not a consecutive number, the reception-side relay device 30 determines that the split data with a missing sequence number is the missing data DL.

In a case in which the split data is missing, the reception-side relay device 30 complements missing split data DL using the data block DB1 and the redundant block FB1. For example, in a case in which partial data D23 of the missing data DL in the data block DB1 is missing, the reception-side relay device 30 restores the data D23 using the redundant data F2 in the redundant block FB1 arranged in the same column as that of the data D23 and the data D21, D22, D24, . . . , D2N in the redundant block FB1 arranged in the same column as that of the data D23. The reception-side relay device 30 similarly restores other missing parts of the missing data DL.

In a case in which the reception-side relay device 30 cannot complement the missing split data DL using the redundant block FB1, the reception-side relay device 30 transmits a retransmission request to the transmission-side relay device 20. If the transmission-side relay device 20 receives the retransmission request, the transmission-side relay device 20 retransmits the packet in response to the request. In this case, it is preferable for the reception-side relay device 30 to store the redundant data necessary for complementation until the missing data can be complemented.

It is preferable for the transmission-side relay device 20 to perform congestion control in a case in which the transmission-side relay device 20 receives the retransmission request. For example, the transmission-side relay device 20 decreases a congestion window size (CWND) decrease rate at the time of detection of congestion and increases a CWND increase rate at the time of restoration.

If there is no missing data in the data block DB1, the reception-side relay device 30 removes the redundant block FB1, and integrates data blocks with no missing data to generate a packet data stream DSD. This makes it possible to restore the same data stream as the packet data stream DSA.

Here, in a case in which there is no missing data in the data block, the reception-side relay device 30 rapidly integrates the data block DB1 into the packet data stream DSD without waiting for arrival of the redundant block FB1. The reception-side relay device 30 may wait for the redundant block FB1 and integrate the data block DB1 into the packet data stream DSD.

The reception-side relay device 30 splits the packet data stream DSD into data #11 to #14, attaches the TCP/IP header to generate packets P11 to P14, and transmits the packets P11 to P14 to the reception device 40.

Figure 6:
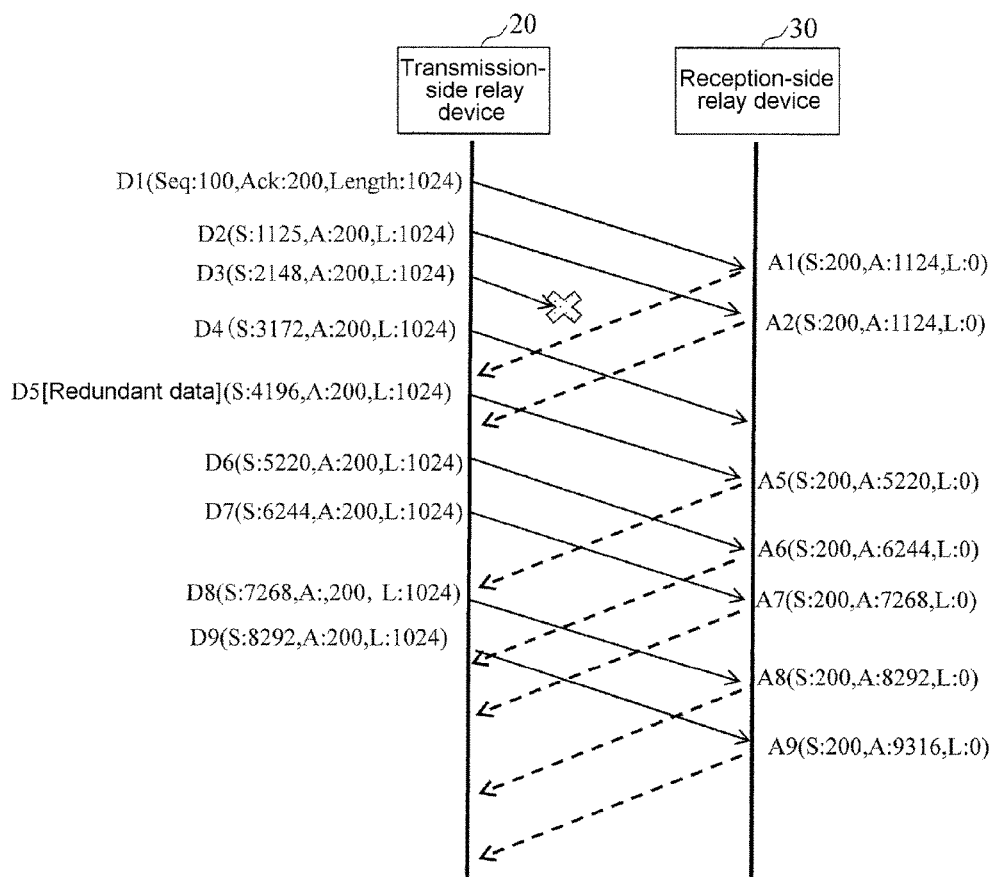
FIG. 6 illustrates an example of a packet transfer procedure according to this embodiment using redundant data.
Figures 7, 8:
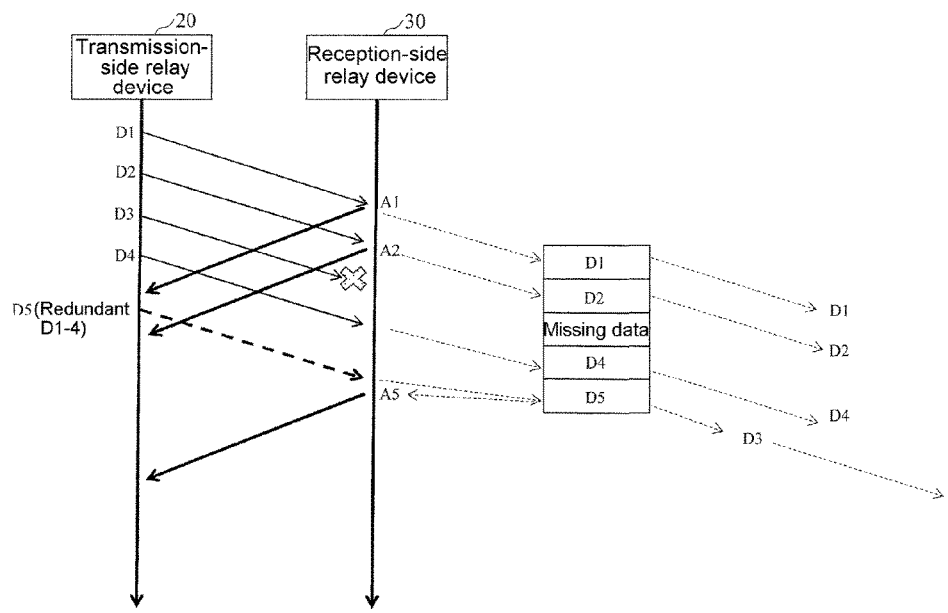
FIG. 7 illustrates an example of data D1 to D5.
FIG. 8 illustrates a first example in which missing data is complemented in the reception-side relay device 30.

FIG. 6 illustrates an example of a packet transfer procedure according to this embodiment using redundant data. In this example, an example in which redundant data of data D1 to D4 is included in data D5 will be described. For example, data D21 to D24 in FIG. 7 are respectively included in packet data D1 to D4, and redundant data F2 in FIG. 7 is included in packet data D5. Although the redundant data is all stored in one packet of D5 for convenience of description, the redundant data may be included over two packets.

If the transmission-side relay device 20 transmits data D1 and the reception-side relay device 30 receives the data D1, the reception-side relay device 30 transmits response data A1 to the transmission-side relay device 20. In a case in which the reception-side relay device 30 cannot receive data D3 transmitted by the transmission-side relay device 20, the reception-side relay device 30 waits for a transmission of a retransmission request until it can be determined whether or not the data D3 can be restored. The reception-side relay device 30 transmits the retransmission request in a case in which the data D3 cannot be restored, and does not transmit the retransmission request in a case in which the data D3 can be restored.

If the reception-side relay device 30 receives the data D5, the reception-side relay device 30 complements the data D3 using the redundant data included in the data D5. In a case in which the data can be complemented, the reception-side relay device 30 advances a reception sequence number (ACK) of TCP, and transmits response data A5 indicating reception completion of D3 to D5 to the transmission-side relay device 20.

In this case, the reception-side relay device 30 rapidly integrates the non-missing data D1, D2, and D4 into a packet data stream DSD, as illustrated in FIG. 8. If the reception-side relay device 30 receives the data D5, the reception-side relay device 30 restores the missing data D3 using the redundant data included in the data D1, D2, D4, and D5, and complements the restored data D3 in the packet data stream DSD.

Figure 9:
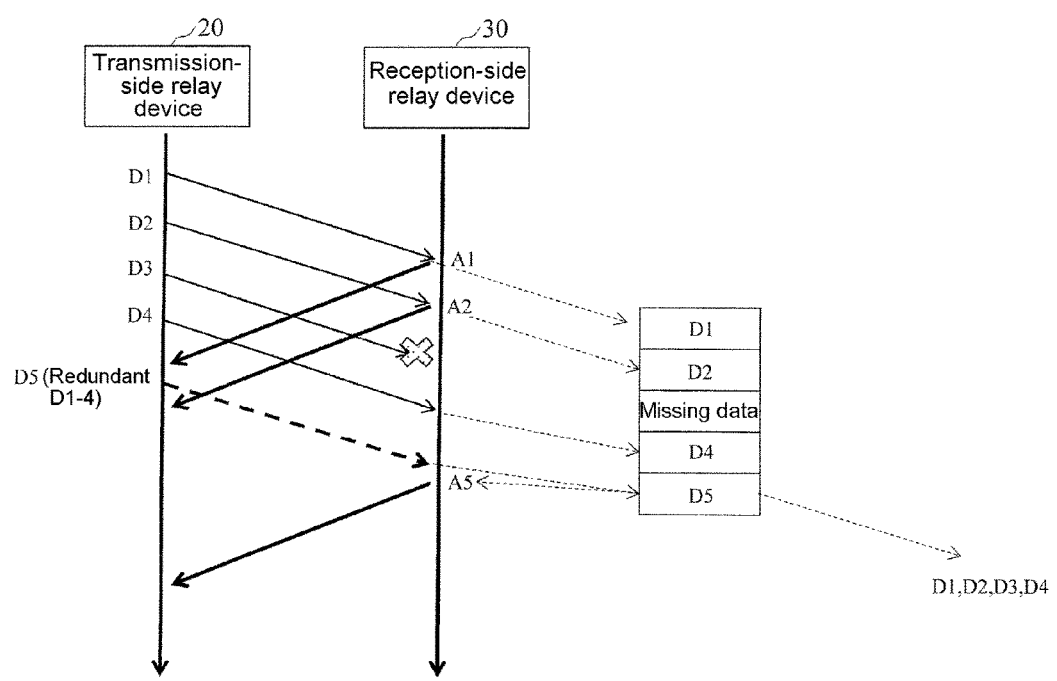
FIG. 9 illustrates a second example in which missing data is complemented in the reception-side relay device 30.

Further, as illustrated in FIG. 9, the reception-side relay device 30 may accumulate the data D1, D2 and D4 until the missing data can be complemented using the redundant data included in the data D5.

In this case, the reception-side relay device 30 restores the data D3 using the data D5 and integrates a data block DB1 with no missing data in the packet data stream DSD.

As described above, the packet transfer system according to this embodiment complements the missing data using subsequently received redundant data even in a case in which data loss occurs. Therefore, with the packet transfer system of this embodiment, it is not necessary to retransmit the packet and it is possible to prevent data transfer speed from being decreased due to congestion control.

Figure 14A:
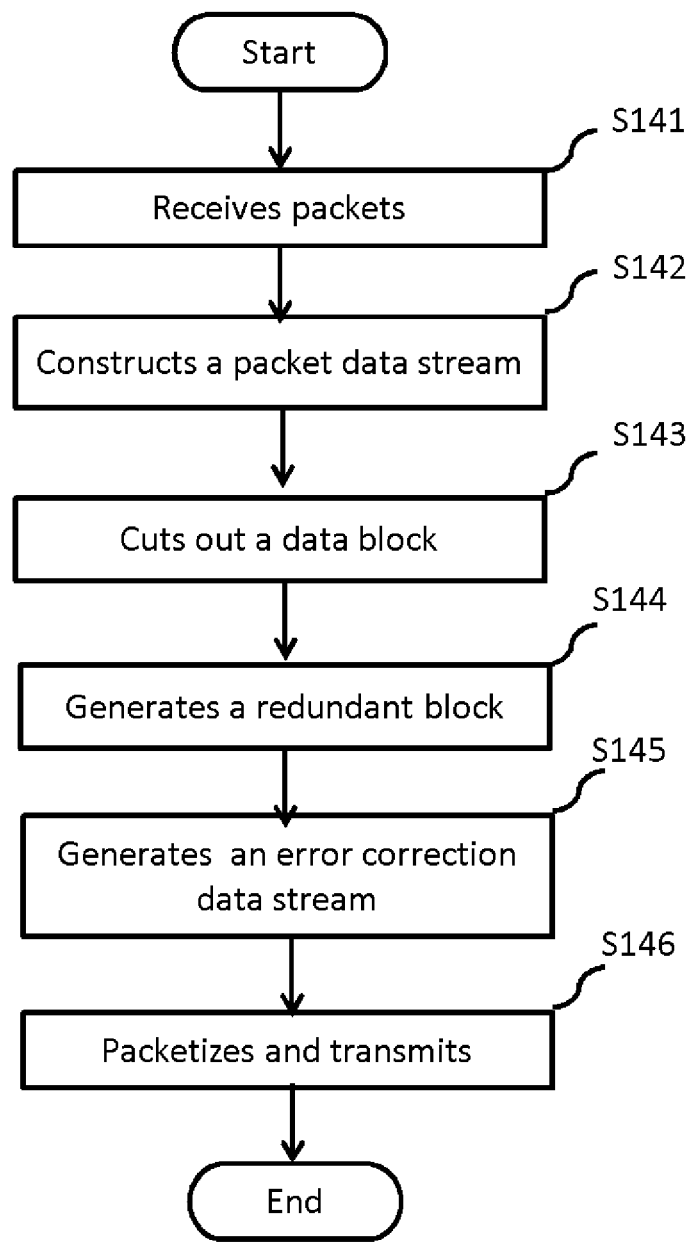
FIG. 14A and FIG. 14B illustrate an example of flowcharts for the computer programs stored in the transmission-side relay device and the reception-side relay device respectively.
Figure 14B:
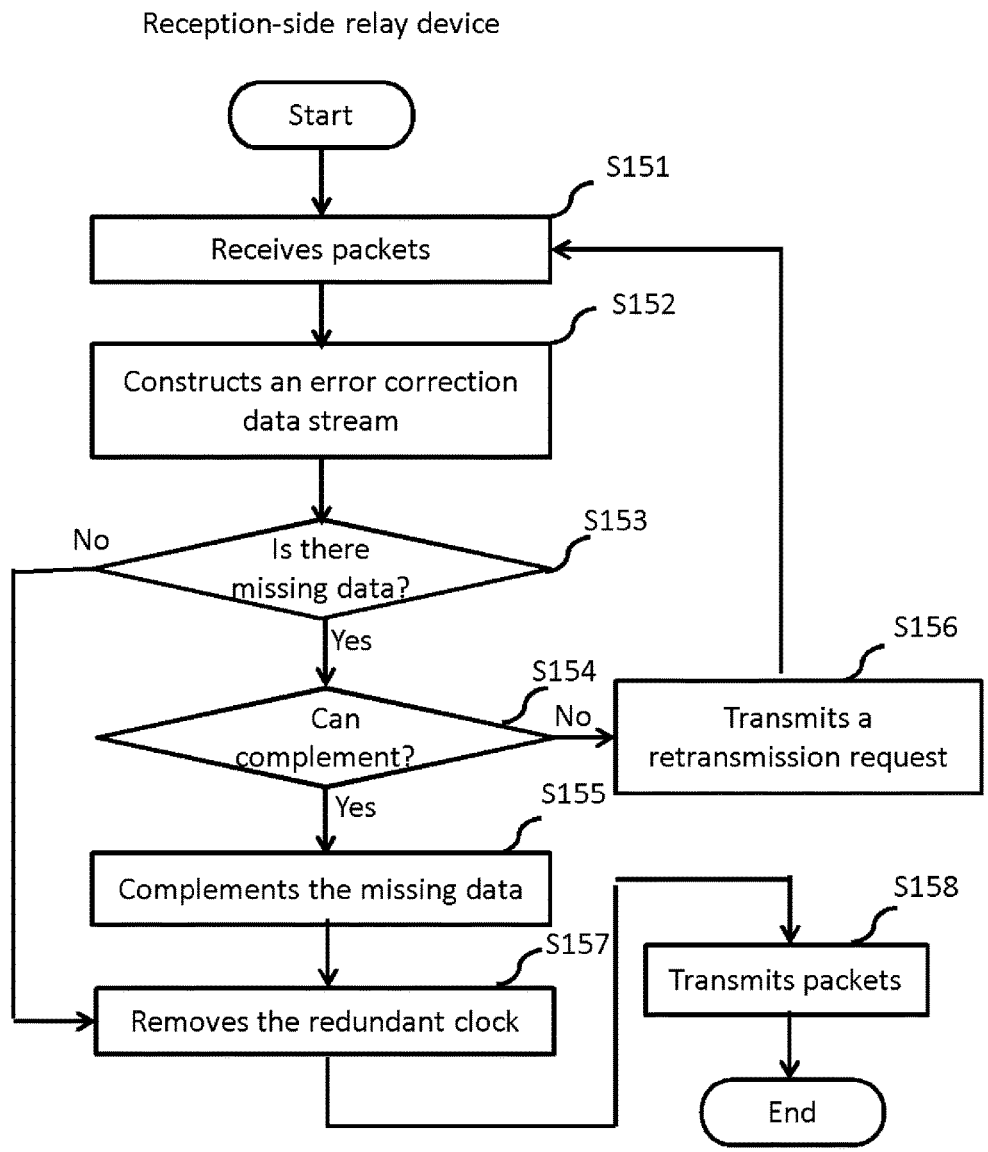

Each function included in the transmission-side relay device 20 may be realized by an integrated circuit within the transmission-side relay device 20 executing a computer program stored in a storage unit. As the integrated circuit, for example, a central processing unit (CPU), a field programmable gate array (FPGA), a large scale integration (LSI), or a digital signal processor (DSP) may be used. Each function included in the reception-side relay device 30 may be realized by an integrated circuit within the reception-side relay device 30 executing a computer program stored in a storage unit. The computer programs may be recorded on a recording medium. FIG. 14A and FIG. 14B illustrate an example of flowcharts for the computer programs stored in the transmission-side relay device and the reception-side relay device respectively.

Embodiment 2

Figure 10:
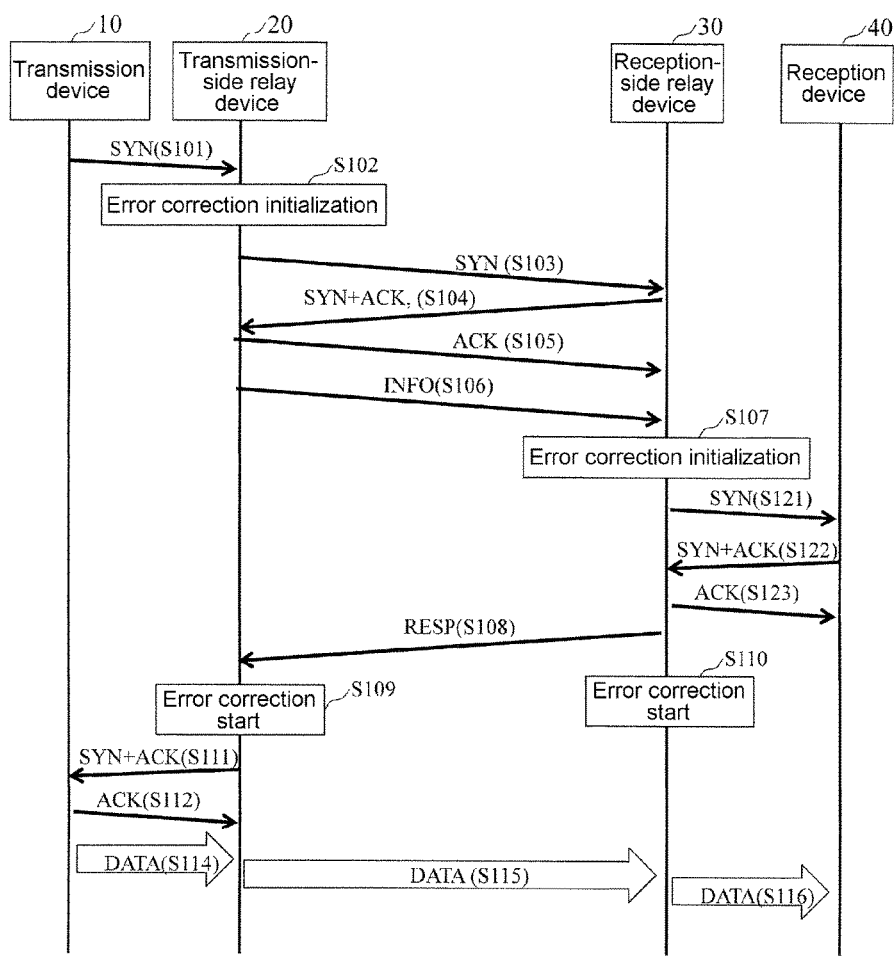
FIG. 10 illustrates an example of a packet transfer start procedure according to Embodiment 2.

In this embodiment, an operation before a packet transfer procedure using redundant data starts will be described. FIG. 10 illustrates an example of the packet transfer start procedure according to this embodiment.

The transmission device 10 transmits a SYN packet to start a TCP connection (S101).

If the transmission-side relay device 20 receives the SYN packet from the transmission device 10, the transmission-side relay device 20 starts initialization of an error correction process (S102).

The transmission-side relay device 20 transmits an SYN packet for performing a TCP connection to the reception-side relay device 30 before starting the data transfer (S103). The reception-side relay device 30 receives the SYN packet and transmits a SYN+ACK packet to the transmission-side relay device 20 (S104).

The transmission-side relay device 20 transmits an ACK packet to the reception-side relay device 30 in response to the SYN+ACK packet (S105) and completes the TCP connection. Further, the transmission-side relay device 20 transmits an INFO packet in which information on the redundant data is included, to the reception-side relay device 30 (S106). The INFO packet includes information indicating whether or not error correction is to be performed, and parameter information on redundancy. The reception-side relay device 30 determines whether or not data reception using redundant data is possible based on the information on the redundant data, initializes an error correction process (S107), and transmits an RESP packet including a determination result to the transmission-side relay device 20 (S108).

In this case, the TCP connection between the reception-side relay device 30 and the reception device 40 is completed (S121 to S123).

In a state in which the error correction cannot be performed, the reception-side relay device 30 transmits a response indicating that data reception using the redundant data is impossible, to the transmission-side relay device 20 (S108). In this case, the transmission-side relay device 20 does not start a packet transfer procedure according to this embodiment using the redundant data in step S109.

In a state in which the error correction can be performed, the reception-side relay device 30 transmits a response indicating that the data reception using the redundant data is possible, to the transmission-side relay device 20 (S108). In this case, the transmission-side relay device 20 and the reception-side relay device 30 start an error correction process according to this embodiment using the redundant data (S109 and S110).

The transmission-side relay device 20 transmits a SYN+ACK packet as a response to the SYN packet (S101) to the transmission device 10 (S111). The transmission device 10 transmits an ACK packet to the transmission-side relay device 20 to complete the TCP connection (S112).

The transmission device 10 starts a packet transfer procedure using the redundant data (S114). For example, the transmission device 10 transmits the packets P11 to P14 illustrated in FIG. 2 to the transmission-side relay device 20. The transmission-side relay device 20 and the reception-side relay device 30 transfers the data #11 to #14 of the packets P11 to P14 using the method described in Embodiment 1 and Embodiment 2. Accordingly, the reception device 40 receives the packets P11 to P14.

Embodiment 3

Figure 11:
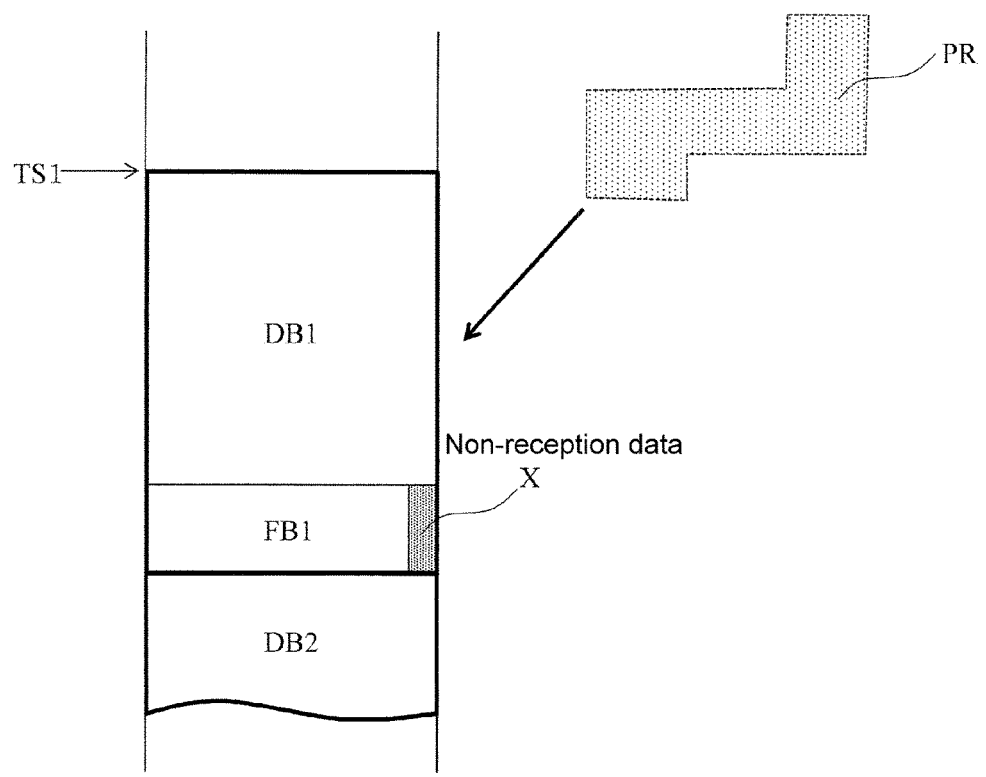
FIG. 11 illustrates an example of a data structure according to Embodiment 3.

In this embodiment, an execution timing of a complementing process of missing data in the reception-side relay device 30 will be described. A case in which the reception-side relay device 30 according to this embodiment receives a packet PR in which a processing pointer of a data block DB1 is TS1 and that includes non-reception data X, as illustrated in FIG. 11, will be described.

Figure 12:
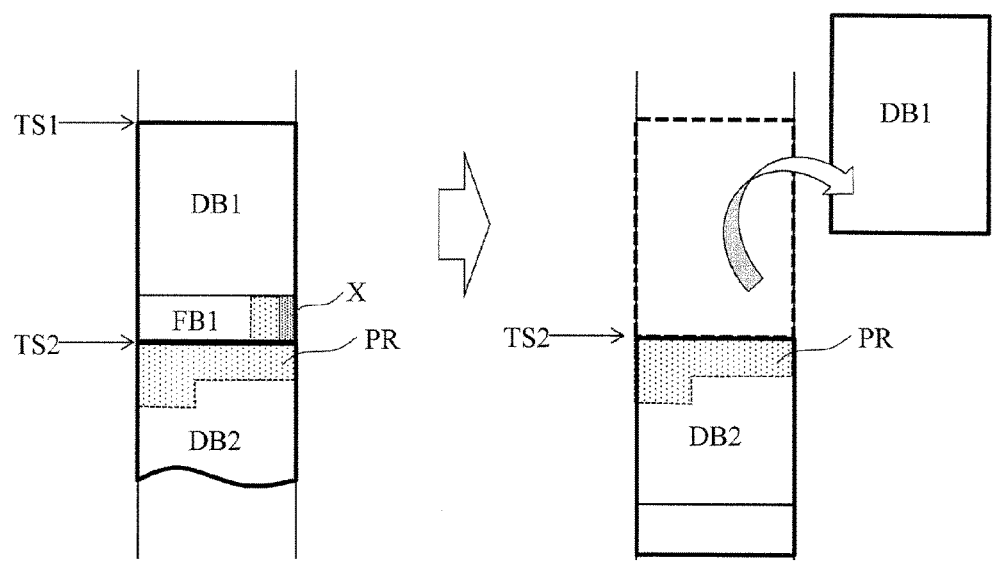
FIG. 12 illustrates a first example in which missing data is complemented according to Embodiment 3.

As illustrated in FIG. 12, in a case in which a packet PR includes both of a FB1 and a data block DB2, the reception-side relay device 30 restores a data block DB1 using FB1 within the packet PR and starts processing of DB2 starting from a processing pointer TS2.

Embodiment 4

In Embodiments 1 to 3, the redundant block FB1 is arranged after the data block DB1, but the present invention is not limited thereto. For example, the redundant block FB1 may be arranged before the data block DB1.

Figure 13:
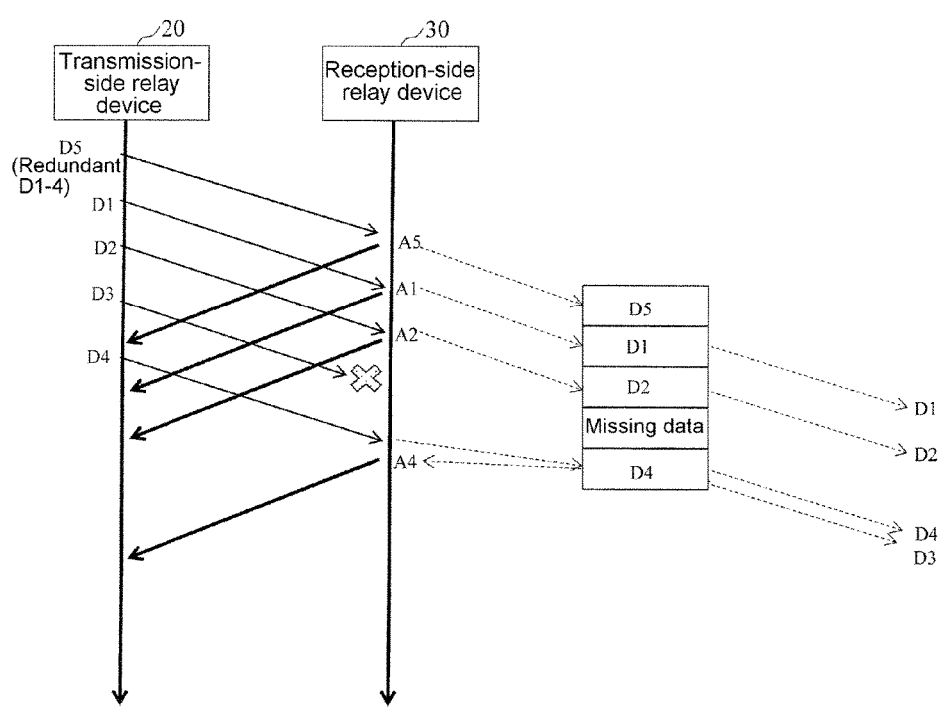
FIG. 13 illustrates an example in which missing data is complemented in a reception-side relay device 30 according to Embodiment 4.

FIG. 13 illustrates an example of a packet transfer procedure according to this embodiment. In this example, an example in which redundant data of data D3 is included in data D5 will also be described, as in FIGS. 6 to 9.

The reception-side relay device 30 receives data D5 and then receives data D1, D2, and D4. The reception-side relay device 30 rapidly integrates non-missing data D1 and D2 into a packet data stream DSD. In a case in which data D3 is missing, if the reception-side relay device 30 receives the data D4, the reception-side relay device 30 restores the data D3 using the data D5 and the data D1, and D4 and integrates D3 together with D4 into the packet data stream DSD.

The present invention is applicable to information and communication industries.

DESCRIPTION OF REFERENCE NUMERALS AND SIGNS

10: Transmission device
20: Transmission-side relay device
30: Reception-side relay device
40: Reception device

What is claimed is:

1. A packet transfer system in which a transmission-side relay device and a reception-side relay device transfer data transmitted from a transmission device to a reception device according to TCP/IP protocol,
wherein the transmission-side relay device includes a first integrated circuit in communication with a first recording medium, the first recording medium storing a first computer program which, when executed by the first integrated circuit, causes the first integrated circuit to perform functions including,
extracting first data included in a first packet transmitted from the transmission device and integrating the first data with data from other packets to obtain a packet data stream,
extracting second data having a predetermined block size determined in advance from the packet data stream to obtain a data block,
encoding the data block with an error correction code to obtain a redundant block of redundant data,
integrating the data block and the redundant block into an error correction data stream, and
packetizing the error correction data stream and transmitting the packetized error correction data stream to the reception-side relay device, and
wherein the reception-side relay device includes a second integrated circuit in communication with the first integrated circuit and a second recording medium, the second recording medium storing a second computer program which, when executed by the second integrated circuit, causes the second integrated circuit to perform functions including,
receiving the packetized error correction data stream transmitted from the transmission-side relay device,
restoring missing data using the redundant data included in the packetized error correction data stream in a case in which there is missing first data to produce a corrected packet data stream,
packetizing the corrected packet data stream to produce a packetized packet data stream and transmitting the packetized packet data stream to the reception device, and
requesting the transmission-side relay device to retransmit the missing data when the missing data cannot be restored using the redundant data.

2. The packet transfer system according to claim 1, wherein
the first computer program further causes the first integrated circuit to perform a function of retransmitting the missing data to the reception-side relay device and controlling a congestion window when receiving the retransmission request.

3. The packet transfer system according to claim 1, wherein the second computer program does not cause the second integrated circuit to perform the function of requesting the transmission-side relay device to retransmit the missing data when the missing data can be restored using the redundant data.

4. A relay device that functions as a transmission-side relay device in a packet transfer system in which the transmission-side relay device and a reception-side relay device transfer data transmitted from a transmission device to a reception device according to TCP/IP protocol, the relay device comprising a first integrated circuit in communication with a first recording medium, the first recording medium storing a first computer program which, when executed by the first integrated circuit, causes the first integrated circuit to perform functions including,
extracting first data included in a first packet transmitted from the transmission device and integrating the first data with data from other packets to obtain a packet data stream;
extracting second data having a predetermined block size determined in advance from the packet data stream to obtain a data block;
encoding the data block with an error correction code to obtain a redundant block of redundant data;
integrating the data block and the redundant block into an error correction data stream,
packetizing the error correction data stream and transmitting the packetized error correction data stream to the reception-side relay device; and
retransmitting the missing reception-side relay device responsive to receiving the retransmission request from the reception side relay device when the missing data cannot be restored using the redundant data by the reception-side relay device.

5. A relay device that functions as a reception-side relay device in a packet transfer system in which a transmission-side relay device and the reception-side relay device transfer data transmitted from a transmission device to a reception device according to TCP/IP protocol,
wherein the transmission-side relay device includes a first integrated circuit in communication with a first recording medium, the first recording medium storing a first computer program which, when executed by the first integrated circuit, causes the first integrated circuit to perform functions including,
extracting first data included in a first packet transmitted from the transmission device and integrating the first data with data from other packets to obtain a packet data stream,
extracting second data having a predetermined block size determined in advance from the packet data stream to obtain a data block,
encoding the data block with an error correction code to obtain a redundant block of redundant data,
integrating the data block and the redundant block into an error correction data stream, and
packetizing the error correction data stream and transmitting the packetized error correction data stream to the reception-side relay device, and
wherein the reception-side relay device includes a second integrated circuit in communication with the first integrated circuit and a second recording medium, the second recording medium storing a second computer program which, when executed by the second integrated circuit, causes the second integrated circuit to perform functions including,
receiving the packetized error correction data stream transmitted from the transmission-side relay device;
restoring missing data using the redundant data included in the packetized error correction data stream in a case in which there is missing first data to produce a corrected packet data stream;

packetizing the corrected packet data stream to produce a packetized packet data stream and transmitting the packetized packet data stream to the reception device; and requesting the transmission-side relay device to retransmit the missing data when the missing data cannot be restored using the redundant data.

6. A packet transfer method in which a transmission-side relay device and a reception-side relay device transfer data transmitted from a transmission device to a reception device according to TCP/IP protocol, wherein the transmission-side relay device extracts first data included in a first packet transmitted from the transmission device and integrating the first data with data from other packets to obtain a packet data stream, extracts second data having a predetermined block size determined in advance from the packet data stream to obtain a data block, encodes the data block with an error correction code to obtain a redundant block of redundant data, integrates the data block and the redundant block into an error correction data stream, and packetizes the error correction data stream and transmits the packetized error correction data stream to the reception-side relay device, and wherein the reception-side relay device receives the packetized error correction data stream transmitted from the transmission-side relay device, restores missing data using the redundant data included in the packetized error correction data stream in a case in which there is missing first data to produce a corrected packet data stream, packetizes the corrected packet data stream to produce a packetized packet data stream and transmits the packetized packet data stream to the reception device, and requests the transmission-side relay device to retransmit the missing data when the missing data cannot be restored using the redundant data.

* * * * *